(12) United States Patent  (10) Patent No.: US 8,993,155 B2
Okutani et al.  (45) Date of Patent: Mar. 31, 2015

(54) PRISMATIC SECONDARY BATTERY

(75) Inventors: Eiji Okutani, Kasai (JP); Yoshinori Yokoyama, Kasai (JP); Takayuki Hattori, Kasai (JP); Yasuhiro Yamauchi, Kasai (JP)

(73) Assignee: SANYO Electric Co., Ltd., Daito-shi (JP)

( * ) Notice: Subject to any disclaimer, the term of this patent is extended or adjusted under 35 U.S.C. 154(b) by 276 days.

(21) Appl. No.: 13/551,241

(22) Filed: Jul. 17, 2012

(65) Prior Publication Data

US 2014/0023914 A1 Jan. 23, 2014

(51) Int. Cl.
*H01M 2/04* (2006.01)
*H01M 2/30* (2006.01)

(52) U.S. Cl.
CPC .............. *H01M 2/0482* (2013.01); *H01M 2/30* (2013.01)
USPC ........... 429/182; 429/181; 429/163; 429/175; 429/162; 429/178; 429/179

(58) Field of Classification Search
CPC .................................. H01M 2/26; H01M 2/30
USPC ................................................. 429/179, 182
See application file for complete search history.

(56) References Cited

U.S. PATENT DOCUMENTS

| 2005/0064286 | A1* | 3/2005 | Kozu et al. | 429/180 |
|---|---|---|---|---|
| 2005/0106454 | A1* | 5/2005 | Kozu et al. | 429/175 |
| 2005/0112456 | A1* | 5/2005 | Kozu et al. | 429/62 |
| 2008/0299453 | A1 | 12/2008 | Shinyashiki et al. | |
| 2009/0038145 | A1* | 2/2009 | Kozu et al. | 29/623.2 |
| 2010/0316906 | A1 | 12/2010 | Nansaka et al. | |
| 2011/0045345 | A1* | 2/2011 | Tsuchiya et al. | 429/179 |
| 2011/0183195 | A1* | 7/2011 | Nngai | 429/181 |

* cited by examiner

*Primary Examiner* — Carlos Barcena
*Assistant Examiner* — Wojciech Haske
(74) *Attorney, Agent, or Firm* — Westerman, Hattori, Daniels & Adrian, LLP

(57) ABSTRACT

In a prismatic secondary battery, an internal negative electrode terminal is electrically connected to a collector through through-holes formed in a sealing plate, a gasket, and an insulating member in a manner electrically insulated from the sealing plate. The sealing plate has one face on which a protrusion is formed, an insulating plate has a face that is on the sealing plate and on which a concave portion fitted to the protrusion is formed, each of the protrusion and the concave portion of the insulating plate is provided at one position on respective sides of the through-hole, and at least one of the protrusions has a top face on which a concave portion is formed. The battery having such a structure is unlikely to cause rotary displacement between the insulating plate and the sealing plate even when a rotary torque is applied to the internal terminal.

20 Claims, 5 Drawing Sheets

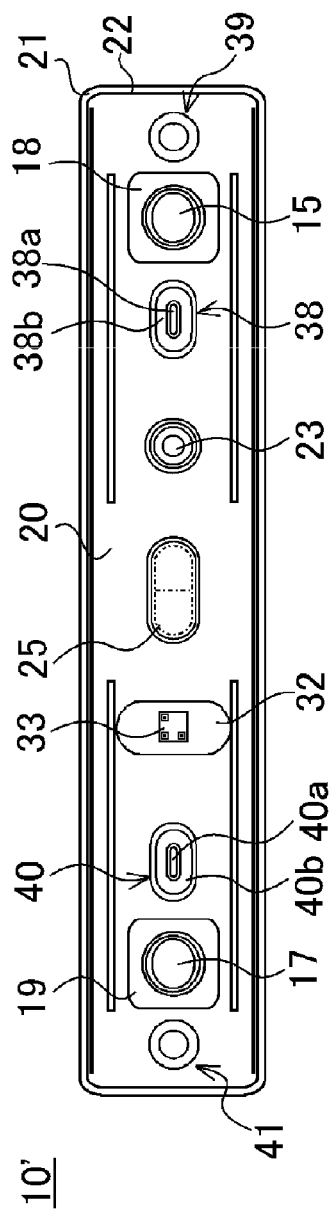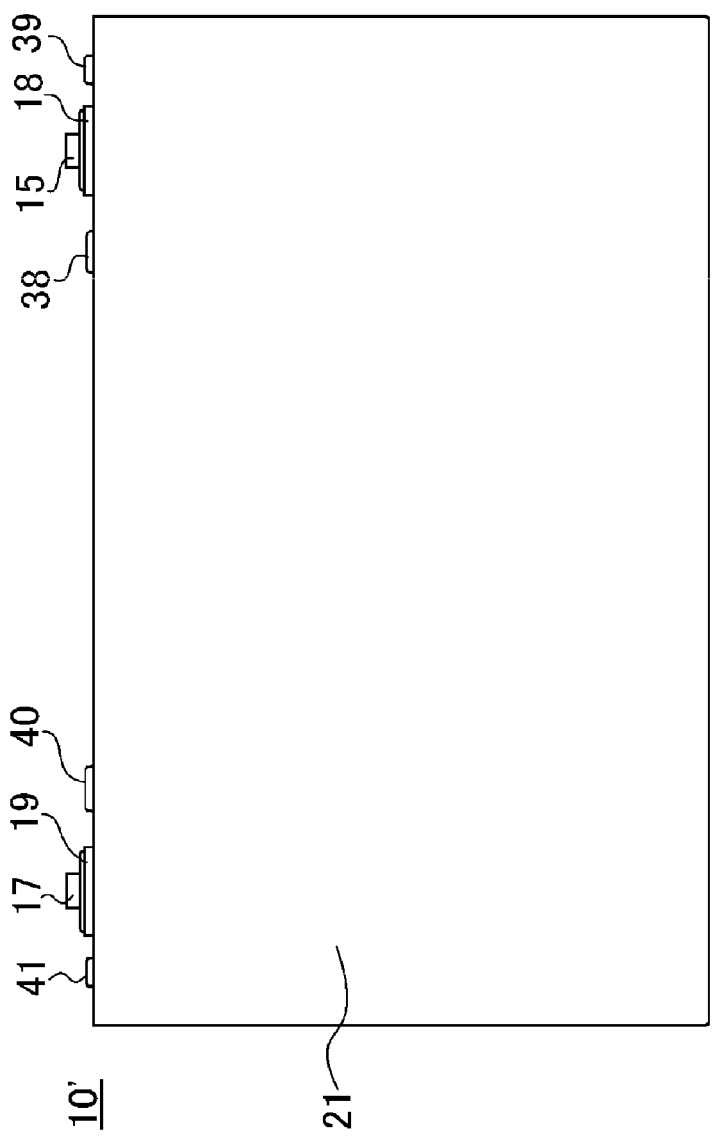

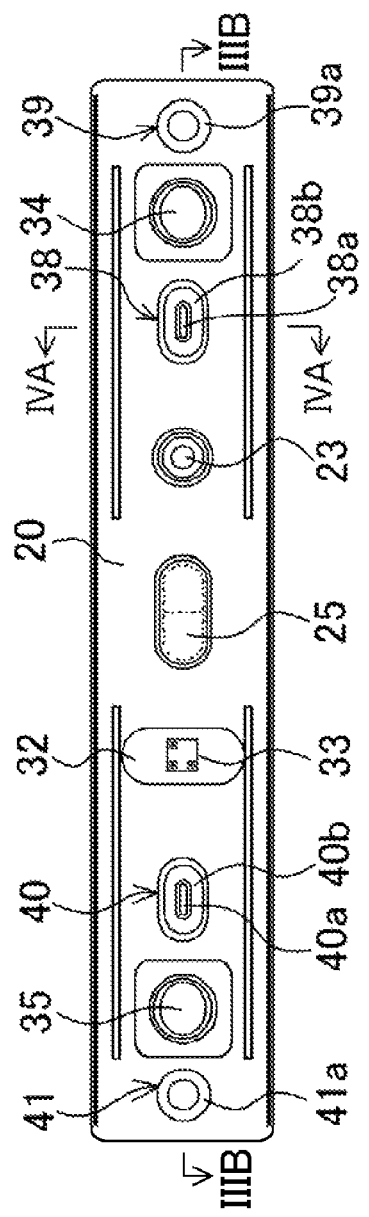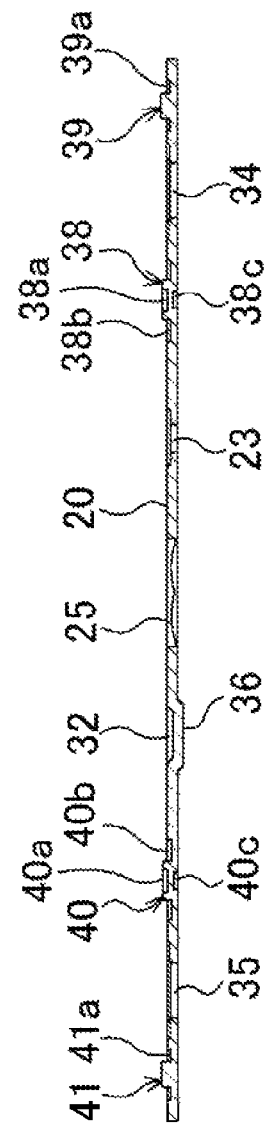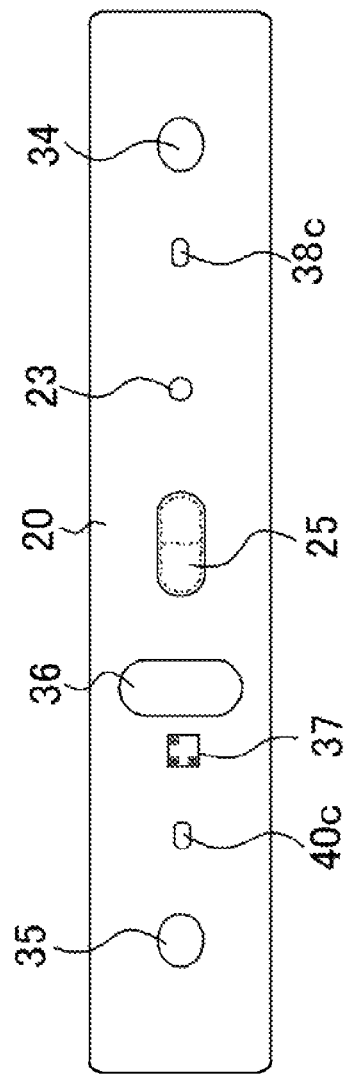

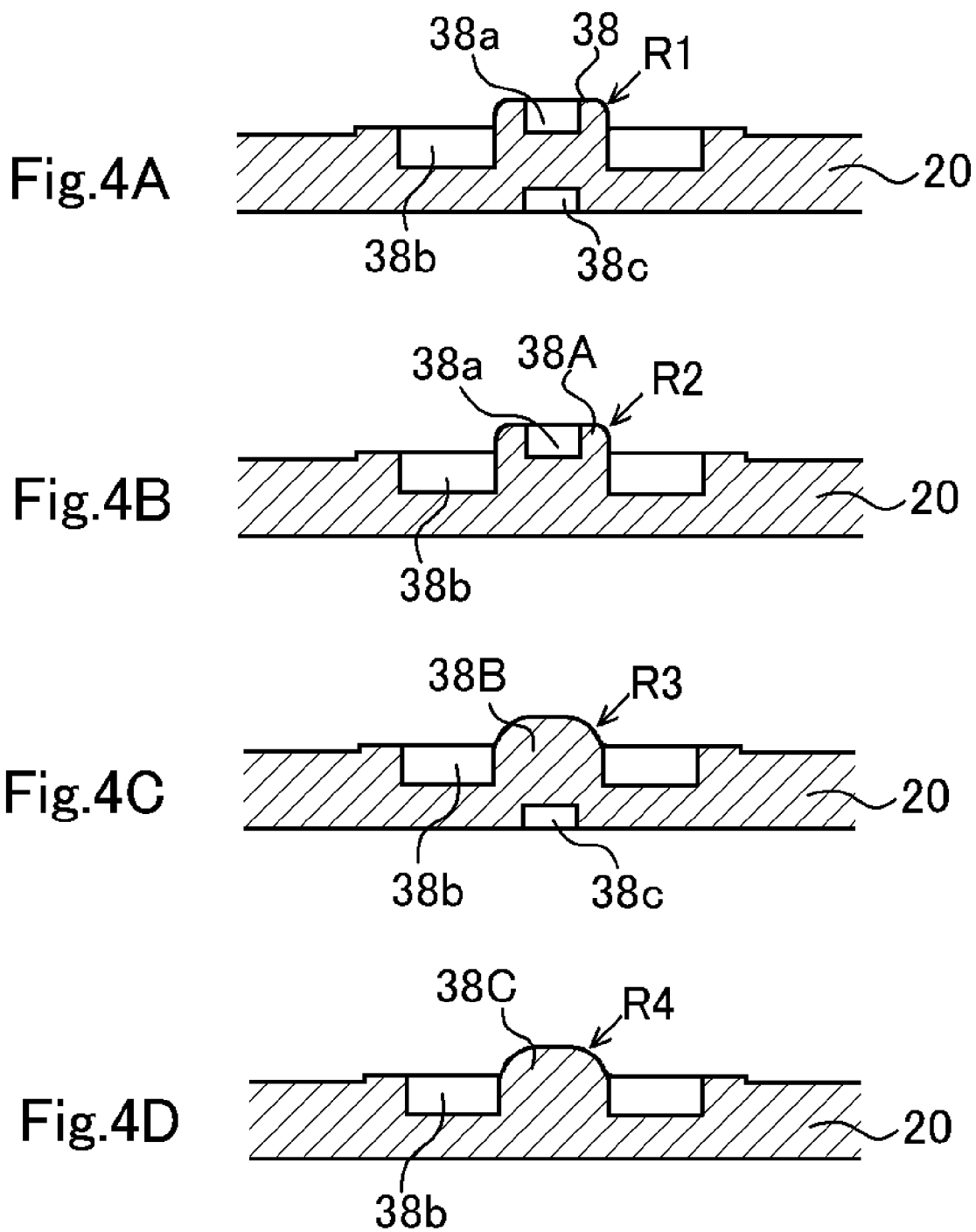

PRISMATIC SECONDARY BATTERY

TECHNICAL FIELD

The present invention relates to a prismatic secondary battery best suited for forming a battery pack that is a combination of a plurality of the prismatic secondary batteries.

BACKGROUND ART

Alkaline secondary batteries typified by a nickel-hydrogen battery and nonaqueous electrolyte secondary batteries typified by a lithium ion battery are widely used as power supplies for driving portable electronic equipment such as cell phones including smartphones, portable computers, PDAs, and portable music players, alkaline secondary batteries typified by a nickel-hydrogen battery and nonaqueous electrolyte secondary batteries typified by a lithium ion battery are widely used. In addition, alkaline secondary batteries and nonaqueous electrolyte secondary batteries are also widely used for power supplies for driving electric vehicles (EVs) and hybrid electric vehicles (HEVs, PHEVs) and in stationary storage battery systems for suppressing the variation in output power of photovoltaic generation, wind power generation and the like, and for peak shifts in system power in order to store electric power during the night time and to use the electric power during daytime.

A single secondary battery has a low electromotive force and even a lithium ion secondary battery that is considered to have a comparatively high electromotive force has an electromotive force of about 4 V. For using such a battery for vehicles such as EVs, HEVs, and PHEVs that need high capacity and high output characteristics, each battery is upsized, and a number of batteries are connected in series or parallel to form a battery pack as shown in, for example, US 2010/316906 (A1) and US 2008/299453 (A1). To address this, in these applications, prismatic secondary batteries are typically used from the viewpoint of space efficiency.

Examples of such a battery pack include a battery pack in which each battery terminal is extended, the extended terminal is bent, overlapped onto an adjacent battery terminal, and welded or bolted for connection, or include a battery pack in which battery terminals adjacent to each other are connected through a connection member such as a bus bar by welding or bolting. Among them, in a prismatic secondary battery in which a terminal is connected to an adjacent battery terminal through a connection member such as a bus bar, as shown in US 2010/316906 (A1) for example, a battery is known in which each of an external positive electrode terminal and an external negative electrode terminal is formed of a conductive member having a bolt, and the connection member such as a bus bar is bolted directly to the battery.

The prismatic secondary battery having an external positive electrode terminal and an external negative electrode terminal that are formed of the conductive member having a bolt can sufficiently reduce the contact resistance between the bus bar and the external terminal of each battery, thereby achieving a reduction in the internal resistance of a battery pack and high reliability. However, in order to sufficiently reduce the contact resistance between the bus bar and the external terminal of each battery, the bus bar is required to be strongly bolted to the external positive electrode terminal or the external negative electrode terminal.

The external positive electrode terminal and the external negative electrode terminal that are connection points for connecting batteries through the bus bar are electrically connected to an internal positive electrode terminal and an internal negative electrode terminal, respectively, that are relay points of output power from inside of the battery. At that time, in order not to cause short circuit between a sealing plate and the external positive electrode terminal and between a sealing plate and the external negative electrode terminal, each of the external positive electrode terminal and the external negative electrode terminal is disposed on a surface of the sealing plate through an insulating member.

When the bus bar is connected to the external positive electrode terminal or the external negative electrode terminal formed of the conductive member having the bolt in order to form a battery pack, bolting generates rotary torque. Thus, in a conventional prismatic secondary battery, the insulating member has a back face on which a concave portion is provided for suppressing rotation, and the sealing plate has a front face on which a protrusion is provided for suppressing rotation, where the concave portion and the protrusion are opposed to each other. The protrusion for suppressing rotation provided on the front face of the sealing plate is formed by forging concurrently with the formation of a pair of mouths for attaching a positive electrode terminal and a negative electrode terminal, an electrolyte pour hole, and a gas release valve, for example.

The method for forming, for example, the protrusion and the mouths on the front face of the sealing plate by forging enables the formation at relatively low cost but results in a protrusion having an R-shaped end due to the characteristics of forging. Thus, the protrusion formed by forging on the front face of the sealing plate has an R-shaped top end, and such a shape reduces the area of a protrusion face in contact with the concave portion of the insulating member in a longitudinal direction, thereby reducing the rotation suppressing effect of the protrusion. In addition, in conventional prismatic secondary battery, the protrusion of the sealing plate is provided at one position, and the concave portion of the insulating member is provided at one position with respect to each of the external positive, electrode terminal and the external negative electrode terminal. Hence, when the bus bar is bolted to the external positive electrode terminal or the external negative electrode terminal, a load is concentrated to the insulating member thereby to deform the insulating member.

SUMMARY

An advantage of some aspects of the present invention is to provide a prismatic secondary battery in which a protrusion formed on a front face of a sealing plate has an R shape with a small radius to increase a contact area between the protrusion and a concave portion of an insulating member and as a result, the insulating member is unlikely to rotate and to be deformed when a bus bar is bolted to an external positive electrode terminal or an external negative electrode terminal.

According to an aspect of the invention, a prismatic secondary battery includes a prismatic hollow outer body having a mouth portion and a bottom, a sealing plate sealing up the mouth portion, an electrode assembly stored in the prismatic hollow outer body, and an internal terminal electrically connected to the electrode assembly. A first insulating member is disposed on a first face of the sealing plate, and a second insulating member is disposed on a second face of the sealing plate. The first insulating member includes a conductive member having a bolt standing on an opposite face to the sealing plate. Each of the sealing plate, the first insulating member, and the second insulating member has a through-hole, the internal terminal is electrically connected to the conductive member through the through-holes formed in the sealing plate, the first insulating member, and the second insulating member in a manner electrically insulated from the sealing plate. A protrusion is formed on the first face of the sealing plate, a concave portion is formed on a face of the first insulating member closer to the sealing plate and being fitted to the protrusion. In the prismatic secondary battery, each of the protrusion and the concave portion of the first insulating member is provided at one position on both sides of the through-hole, and a concave portion is formed on a top face of at least one of the protrusions.

The sealing plate is typically produced by forging. The top of the protrusion formed on the sealing plate has an R shape with a large radius due to the characteristics of forging even when the used die is designed so as to form a flat top face. Thus, when the protrusion of the sealing plate is fitted to the concave portion of the first insulating member, the contact area between the lateral face of the protrusion of the sealing plate and the inner face of the first insulating member is much smaller than a designed area. This reduces a load-bearing capacity of the fitting portion between the protrusion of the sealing plate and the concave portion of the first insulating member.

In the prismatic secondary battery of the invention, the concave portion is formed on the top of the protrusion of the sealing plate. The concave portion expands the top area of the protrusion in a diameter expanding direction to reduce the radius of the R shape, thereby increasing the contact area between the lateral face of the protrusion of the sealing plate and the inner face of the first insulating member. Therefore, the prismatic secondary battery of the invention obtains a large load-bearing capacity of the fitting portion between the protrusion of the sealing plate and the concave portion of the first insulating member and, as a result, is unlikely to cause rotational displacement between the sealing plate and the first insulating member due to the rotary torque caused at the time of bolting of a bus bar etc. to the bolt formed on the conductive member.

In addition, in the prismatic secondary battery of the invention, each of the protrusion and the concave portion of the first insulating member is provided at one position on both sides of the through-hole. Such a structure disperses the rotary torque applied to the fitting portion between the protrusion of the sealing plate and the concave portion of the first insulating member. Therefore, the prismatic secondary battery of the invention is further unlikely to cause the rotational displacement between the sealing plate and the first insulating member. The prismatic secondary battery of the invention may include a current interruption mechanism as a safe means between the electrode assembly and the internal terminal and may include a gas release valve on the sealing plate. The protrusion may have any of a disk shape, an ellipse shape, or a polygonal shape in a planar view.

In the prismatic secondary battery of the aspect, it is preferable that an annular concave portion be formed around at least one of the protrusions and have a height less than that of the first face of the sealing plate. It is also preferable that an annular protrusion be formed around at least one of the concave portions of the first insulating member and be fitted to the annular concave portion.

Such a structure increases the number of the fitting portions and the area of the fitting portion between the sealing plate and the first insulating member, and hence the rotational displacement between the sealing plate and the first insulating member is further unlikely to be caused. The annular concave portion may have a shape depending on the protrusion shape.

In the prismatic secondary battery of the aspect, the first insulating member may include a gasket for electrically insulating the internal terminal from the sealing plate and an insulating plate disposed between the conductive member and the sealing plate, and at least one of the concave portions and at least one of the annular protrusions of the first insulating member may be formed on the insulating plate.

The internal terminal is required to penetrate the sealing plate while insulated from the sealing plate and air tightness is required to be maintained between the internal terminal and the sealing plate. When the first insulating member includes two members of the gasket and the insulating plate, the insulating plate can ensure the insulation between the sealing plate and the conductive member as well as the gasket can readily ensure the insulation and the air tightness between the internal terminal and the sealing plate.

In the prismatic secondary battery of the aspect, it is preferable that the insulating plate include a cave and the conductive member be fitted into the cave of the insulating plate.

With the battery having such a structure, the fitting portion to the insulating plate can absorb a part of the rotary torque applied to the conductive member. Thus, such a battery is further unlikely to cause the rotary displacement between the sealing plate and the insulating plate.

In the prismatic secondary battery of the aspect, it is preferable that the sealing plate have a concave portion on the second face at a position corresponding to each protrusion.

When the sealing plate has such a structure, a sealing plate forming material is used for the protrusion in an amount corresponding to that of the concave portion at the time of production of the sealing plate by forging, thereby further reducing the radius of the R shape of the protrusion. Therefore, the prismatic secondary battery of the invention obtains a larger load-bearing capacity of the fitting portion between the protrusion of the sealing plate and the concave portion of the first insulating member and is consequently further unlikely to cause the rotational displacement between the sealing plate and the first insulating member due to the rotary torque caused at the time of bolting of a bus bar etc. to the bolt formed on the conductive member.

In the prismatic secondary battery of the aspect, the internal terminal may be electrically connected to the electrode assembly through a collector, the collector may have a through-hole and may be brought into contact with a face of the second insulating member, the face being opposite to the face on which the sealing plate is located, and the internal terminal may pass through the through-hole of the collector to electrically connect the conductive member and the collector.

With such a structure, a simple structure enables the electrical connection between the conductive member and the collector.

In the prismatic secondary battery of the aspect, it is preferable that the internal terminal and the collector, and the internal terminal and the conductive member be electrically connected by crimping of respective ends of the internal terminal.

Such a structure increases binding strength of the sealing plate, the first insulating member, the second insulating member, and the collector and thus the rotary torque applied to the conductive member is unlikely to be applied to the collector. As a result, a prismatic secondary battery with higher reliability can be obtained.

BRIEF DESCRIPTION OF THE DRAWINGS

The invention will be described with reference to the accompanying drawings, wherein like numbers reference like elements.

FIG. 2A is a plan view of the prismatic nonaqueous electrolyte secondary battery of the embodiment without external terminals and insulating members and FIG. 2B is a front view of the prismatic nonaqueous electrolyte secondary battery.

FIG. 3A is a plan view of a sealing plate of the embodiment, FIG. 3B is a sectional view taken along the line IIIB-IIIB in FIG. 3A, and FIG. 3C is a bottom view of the sealing plate.

FIG. 4A is a sectional view taken along the line IVA-IVA in FIG. 3A, FIG. 4B is a similar sectional view of an alternate embodiment, FIG. 4C is a similar sectional view of a comparative example 1, and FIG. 4D is a similar sectional view of a comparative example 2.

DESCRIPTION OF EXEMPLARY EMBODIMENTS

Hereinafter, embodiments of the invention will be described in detail with reference to the accompanying drawings. However, each embodiment described below is intended to exemplify the technical spirit of the invention, the invention is not intended to be limited to the embodiments, and the invention may equally be applied to various modified cases without departing from the technical spirit described in the claims. In each drawing used for explanation in the specification, each member is appropriately shown on a different scale so that the member has a recognizable size in each drawing and the members are not necessarily shown in proportion to the actual sizes.

Embodiment

Figure 1:
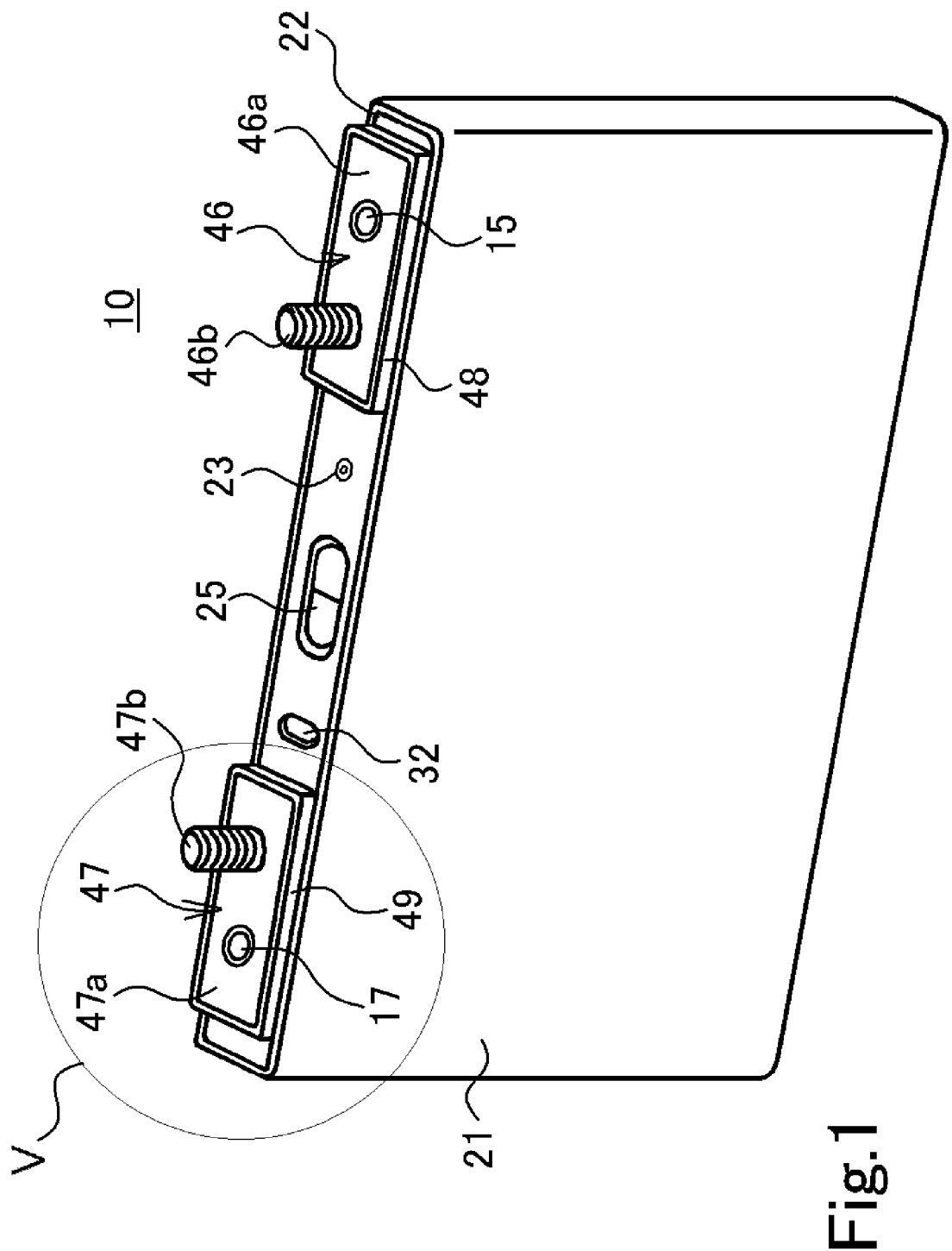
FIG. 1 is a perspective view of a prismatic nonaqueous electrolyte secondary battery of an embodiment.

Firstly, as an example of a prismatic secondary battery of the embodiment, a prismatic nonaqueous electrolyte secondary battery will be described with reference to FIG. 1 and FIG. 2. FIG. 1 is a perspective view of the prismatic nonaqueous electrolyte secondary battery of the embodiment. FIG. 2A is a plan view of the prismatic nonaqueous electrolyte secondary battery of the embodiment without external terminals and insulating members and FIG. 2B is a front view of the prismatic nonaqueous electrolyte secondary battery.

A prismatic nonaqueous electrolyte secondary battery 10 includes a flat wound electrode assembly in which a positive electrode sheet and a negative electrode sheet are wound while being insulated from each other through a separator, which are not shown in the drawings. The positive electrode sheet is prepared by coating both faces of a positive electrode substrate made from aluminum foil with a positive electrode active material mixture, then drying and rolling the coated substrate, and slitting the substrate so as to expose the aluminum foil in a strip shape. Separately, the negative electrode sheet is prepared by coating both faces of a negative electrode substrate made from copper foil with a negative electrode active material mixture, then drying and rolling the coated substrate, and slitting the substrate so as to expose the copper foil in a strip shape.

Then, the flat wound electrode assembly is prepared as follows. The positive electrode sheet and the negative electrode sheet obtained as above are stacked interposing a polyolefin microporous separator therebetween so as to displace the aluminum foil exposed portion of the positive electrode sheet and the copper foil exposed portion of the negative electrode sheet from the corresponding counter electrode active material mixtures, and the whole is wound while insulating the positive electrode sheet and the negative electrode sheet from each other through the separator to afford the flat wound electrode assembly including one end with a plurality of stacked positive electrode substrate exposed portions and the other end with a plurality of stacked negative electrode substrate exposed portions.

The plurality of stacked positive electrode substrate exposed portions are electrically connected through a positive electrode collector made of aluminum to an internal positive electrode terminal 15 also made of aluminum, and similarly, the plurality of stacked negative electrode substrate exposed portions are electrically connected through a negative electrode collector 16 made of copper to an internal negative electrode terminal 17 also made of copper. The internal positive electrode terminal 15 and the internal negative electrode terminal 17 are fixed to a sealing plate 20 made of, for example, aluminum through first insulating members 18 and 19, respectively.

The flat wound electrode assembly 11 prepared as above is wrapped with a resin sheet (not shown in the drawings) having insulating characteristics except the sealing plate 20 side and is inserted into a prismatic hollow outer body 21 made of, for example, aluminum having an open face. Then, the sealing plate 20 is fitted to the mouth portion of the prismatic hollow outer body 21; a fitting portion 22 between the sealing plate 20 and the prismatic hollow outer body 21 is laser-welded; then, a nonaqueous electrolyte is poured from an electrolyte pour hole 23; and the electrolyte pour hole 23 is sealed up to produce the prismatic nonaqueous electrolyte secondary battery 10' before being provided with an external positive electrode terminal 46 and an external negative electrode terminal 47 as in FIG. 3.

The sealing plate 20 is equipped with a gas release valve 25 at the center between the internal positive electrode terminal 15 and the internal negative electrode terminal 17. The gas release valve 25 opens when the gas pressure becomes higher than the working pressure of a current interruption mechanism (not shown in the drawings) that is provided between the positive electrode collector and the internal positive electrode terminal or between the negative electrode collector and the internal negative electrode terminal. The sealing plate 20 is also equipped with a concave portion 32 on an opposite side to the electrolyte pour hole 23 with respect to the gas release valve 25, and is further equipped with a convex portion 36 on the back face corresponding to the concave portion 32 formed position. The formation of the concave portion 32 and the convex portion 36 on the sealing plate 20 in this manner increases the flexural strength of the sealing plate 20 in both the longitudinal direction and the width direction. Consequently, in the prismatic nonaqueous electrolyte secondary battery 10', the deformation of the sealing plate 20 when the internal pressure is increased is suppressed. This results in, in cooperation with the gas release valve 25 positioned at the center between a mouth 34 for attaching the internal positive electrode terminal 15 and a mouth 35 for attaching the internal negative electrode terminal 17, the internal pressure equally applied to the gas release valve 25 to stabilize working pressure of the gas release valve 25.

In addition, a two-dimensional code as a first identification code 33 is optionally formed on a flat face as the bottom of the concave portion 32 on the front face of the sealing plate 20 by laser marking etc. and, similarly, a second identification code 37 is optionally formed by laser marking on a surface of a side adjacent to the convex portion 36 on the back face. The first identification code 33 is formed on the bottom flat face of the concave portion having a height less than that of the other portions that are formed on the front face of the sealing plate 20. Thus, even when a jig for assembling the prismatic nonaqueous electrolyte secondary battery 10 etc. comes into contact with the sealing plate 20, such a jig is unlikely to physically come into contact with the first identification code 33. Therefore, the first identification code 33 is unlikely to be abraded, and the traceability is unlikely to be lost during the assembly process and after the assembly of the prismatic nonaqueous electrolyte secondary battery 10.

The second identification code 36 is not exposed to the outside after the assembly of the prismatic nonaqueous electrolyte secondary battery 10', but is used for tracing during an assembly process of the prismatic nonaqueous electrolyte secondary battery 10'. The first identification code 33 may be the same as or different from the second identification code 36. In addition, the first identification code 33 is formed on the opposite side to the electrolyte pour hole 23 across the gas release valve 25, and this increases the distance between the electrolyte pour hole 23 and the first identification code 33. As a result, even when an electrolyte is dispersed at the time that the electrolyte is poured from the electrolyte pour hole 23 into the prismatic hollow outer body 21, the electrolyte is unlikely to adhere to the first identification code 33, and hence the readability of the identification code 33 is unlikely to deteriorate by the electrolyte.

The prismatic nonaqueous electrolyte secondary battery 10' having such a structure before attaching an external positive electrode terminal 46 and an external negative electrode terminal 47 may be used alone. However, such a battery is combined with the external positive electrode terminal 46 and the external negative electrode terminal 47 to form a prismatic nonaqueous electrolyte secondary battery 10 as shown in FIG. 1 in order to be used as a battery pack. Each specific structure of the external positive electrode terminal 46 and the external negative electrode terminal 47 will be described later.

Next, the specific structure of the sealing plate used for the prismatic nonaqueous electrolyte secondary battery 10 of the present embodiment will be described with reference to FIG. 3. FIG. 3A is a plan view of a sealing plate of the embodiment, FIG. 3B is a sectional view taken along the line IIIB-IIIB in FIG. 3A, and FIG. 3C is a bottom view.

The sealing plate 20 has, for example, a rectangular shape in a planar view, includes the mouth 34 for attaching the internal positive electrode terminal 15 and the mouth 35 for attaching the internal negative electrode terminal 17 in the vicinity of each end side, and includes the electrolyte pour hole 23, the gas release valve 25, and the concave portion 32 between the mouths 34 and 35. The concave portion 32 has a flat face having a height less than that of the other portions in the sealing plate 20 and being partially formed in a width direction (short side direction) of the sealing plate 20. When the concave portion 32 is formed across the whole width of the sealing plate 20, it becomes a so-called "groove." Such a groove largely reduces the flexural strength of the sealing plate 20 in the longitudinal direction as well as generating a level difference between the sealing plate 20 and the end face of the prismatic hollow outer body 21 thereby to interfere with uniform laser-welding. In the sealing plate 20 of the embodiment, the gas release valve 25 is provided at the center between the mouth 34 for attaching the internal positive electrode terminal 15 and the mouth 35 for attaching the internal negative electrode terminal 17, and the electrolyte pour hole 23 and the concave portion 32 are provided on both sides of the gas release valve 25.

The sealing plate 20 of the embodiment further includes protrusions 38 and 40 and auxiliary protrusions 39 and 41 on both sides of the mouth 34 for the positive electrode and the mouth 35 for the negative electrode, respectively, in order to attach the external positive electrode terminal 46 and the external negative electrode terminal 47 (see FIG. 1) used when a plurality of the prismatic nonaqueous electrolyte secondary batteries are connected in series or parallel. The protrusions 38 and 40 and the auxiliary protrusions 39 and 41 are fitted to insulating plates 48 and 49, described later, (see FIG. 1) for the external positive electrode terminal 46 and the external negative electrode terminal 47 so that the external positive electrode terminal 46 and the external negative electrode terminal 47 are unlikely to rotate, respectively. Each protrusion may have any of a disk shape, an ellipse shape, or a polygonal shape in a planar view. Concave portions 38a and 40a are formed at the top of the protrusions 38 and 40. Annular concave portions 38b, 40b, 39a, and 41a are formed around the protrusions 38 and 40 and the auxiliary protrusions 39 and 41, respectively. The annular concave portions 38b, 40b, 39a, and 41a are formed so as to have shapes corresponding to the shapes of the protrusions 38 and 40 and the auxiliary protrusions 39 and 41, respectively.

In the sealing plate 20, concave portions 38c, 40c are formed on the back face corresponding to the formed positions of the protrusions 38 and 40, respectively. For the sealing plate 20 of the embodiment, a rectangular aluminum plate is punched out to form the mouths 34 and 35 and the electrolyte pour hole 23 by forging, and the gas release valve 25, the concave portion 32; the protrusions 38 and 40, the auxiliary protrusions 39 and 41, and the concave portions 38a and 40a at the top of the protrusions 38 and 40, the annular concave portions 38b, 39a, 40b, and 41a, and concave portions 38c and 40c at the back face corresponding to the formed positions of the protrusions 38 and 40 are simultaneously formed. In the sealing plate 20, the concave portions 38b, 40b, 39a, and 41a formed on the front face around the protrusions 38 and 40 and the auxiliary protrusions 39 and 41 and the concave portions 38c, 40c formed on the back face are provided so as to reduce the radius of each R shape of the protrusions 38 and 40 and the auxiliary protrusions 39 and 41 during the formation of the protrusions 38 and 40 and the auxiliary protrusions 39 and 41 by forging, respectively.

The radius of the R shape will be described with reference to FIG. 4. FIG. 4A is a sectional view taken along the line IVA-IVA in FIG. 3A, FIG. 4B is a similar sectional view of an alternate embodiment, FIG. 4C is a similar sectional view of a comparative example 1, and FIG. 4D is a similar sectional view of a comparative example 2. In FIG. 4, the same components as those shown in FIG. 3 are shown by the same reference characters and are not described in detail.

A protrusion 38A of the alternate embodiment shown in FIG. 4B does not include the concave portion 38c that is formed on the back face of the protrusion 38 of the embodiment shown in FIG. 4A. A protrusion 38B of the comparative example 1 shown in FIG. 4C does not include the concave portion 38a that is formed on the top of the protrusion 38 of the embodiment shown in FIG. 4A. A protrusion 38C of the comparative example 2 shown in FIG. 4D does not include the concave portion 38a or the concave portion 38c that are formed on the top and the back face of the protrusion 38 of the embodiment shown in FIG. 4A, respectively. Here, the R shape of the protrusion of the embodiment shown in FIG. 4A has a radius of R1, the R shape of the protrusion of the alternate embodiment shown in FIG. 4B has a radius of R2, the R shape of the protrusion of the comparative example 1 shown in FIG. 4C has a radius of R3, and the R shape of the protrusion of the comparative example 2 shown in FIG. 4D has a radius of R4.

When a protrusion is formed using a metal material such as aluminum by forging, the formed protrusion has an R-shaped corner that should be a perpendicular corner because the metal material does not smoothly flow into a forging die due to high flowability of the metal material. In the protrusion 38 of the embodiment shown in FIG. 4A, the metal derived from the annular concave portion 38b formed on the front face of the sealing plate 20, from the concave portion 38c formed on the back face of the sealing plate 20, and from the concave portion 38a formed on the top of the protrusion 38 flows into the forging die during the formation of the protrusion 38 by forging, and thus the R shape obtains the smallest radius R1. In contrast, in the protrusion 38A of the alternate embodiment shown in FIG. 4B, the metal in a part corresponding to the concave portion 38c on the back face of the protrusion 38 of the embodiment does not flow into the forging die, and thus the R shape has a larger radius R2 than R1. However, the flow of metal in the part corresponding to the concave portion 38c on the back face of the protrusion 38 of the embodiment is widely spread into the sealing plate 20 and contributes to the reduction of the radius of the R shape in a small degree. Thus, the difference between R2 and R1 is small and the concave portion 38c on the back face of the protrusion 38 provides substantially the same effect as the case without the concave portion 38c.

In the protrusion 38B of the comparative example 1 shown in FIG. 4C, the metal in a part corresponding to the concave portion 38a on the top of the protrusion 38 of the embodiment does not flow into the forging die, and thus the R shape has a larger radius R3 than R1. The relation between R2 and R3 varies depending on the volume relationship between the concave portion 38a and the concave portion 38c. However, when the concave portion 38a and the concave portion 38c have the same volume, the metal in the concave portion 38a on the top of the protrusion 38 flows into the sealing plate 20 at a smaller extent to contribute to the reduction of the radius of the R shape at a larger extent, and consequently the radius R3 is larger than R2. In the protrusion 38c of the comparative example 2 shown in FIG. 4D, the metal in the parts corresponding to the concave portion 38a on the top of the protrusion 38 of the embodiment and the concave portion 38c on the back face does not flow into the forging die, and thus the R shape has a larger radius R4 than R3.

Figure 5:
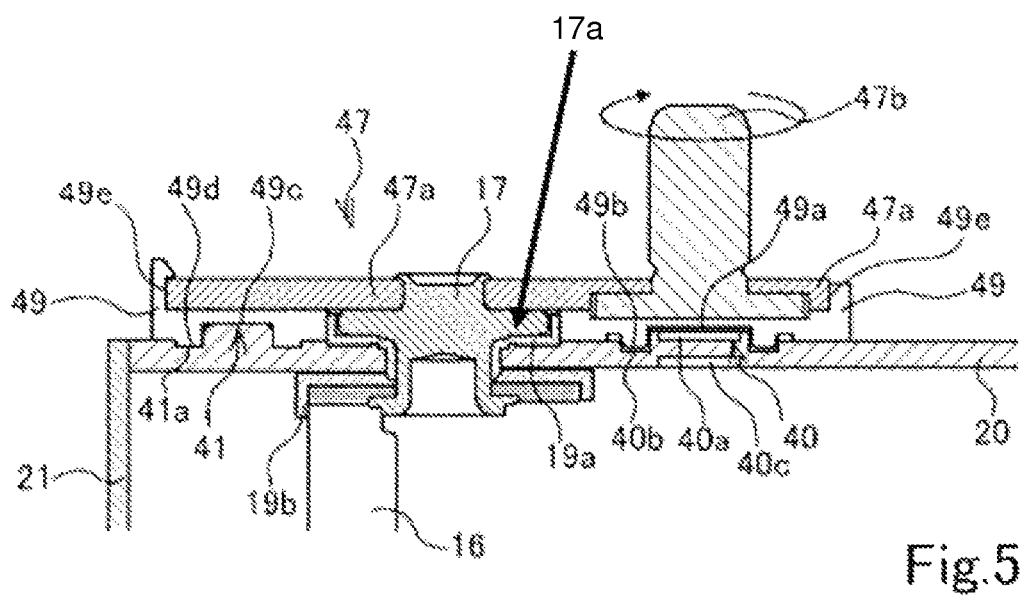
FIG. 5 is an enlarged longitudinal sectional view of a part V in FIG. 1.

The attachment states of the external terminals of the prismatic nonaqueous electrolyte secondary battery of the embodiment will now be described with reference to FIG. 5. The attachment states of the external positive electrode terminal 46 and the external negative electrode terminal 47 have substantially the same structure when the current interruption mechanism is not provided, while using different materials. Thus, the specific structure of the external negative electrode terminal 47 will be described as a typical example with reference to FIG. 5. FIG. 5 is an enlarged longitudinal sectional view of a part V in FIG. 1.

With respect to the mouth 35 formed in the sealing plate 20, a gasket 19a is disposed on the front face of the sealing plate 20, an insulating member 19b is disposed on the back face of the sealing plate 20, and the internal negative electrode terminal 17 is inserted through the gasket 19a and the insulating member 19b. The insulating member 19b corresponds to the second insulating member of the invention. The internal negative electrode terminal 17 has a flange 17a and is disposed so that the bottom face of the flange 17a is in contact with the gasket 19a that is disposed on the front face of the sealing plate 20. Such a structure insulates the internal negative electrode terminal 17 from the sealing plate 20 through the gasket 19a and the insulating member 19b. The negative electrode collector 16 from the electrode assembly (not shown in the drawings) is bent and brought into contact with the bottom of the insulating member 19b, and the internal negative electrode terminal 17 is inserted into a through-hole formed in the negative electrode collector 16.

The external negative electrode terminal 47 includes a plate-like conductive member 47a and a bolt 47b standing on the plate-like conductive member 47a. The plate-like conductive member 47a of the external negative electrode terminal 47 is disposed on the top face of the flange 17a of the internal negative electrode terminal 17. An insulator 49 is disposed between the plate-like conductive member 47a around the internal negative electrode terminal 17 and the sealing plate 20. The insulator 49 and the gasket 19a correspond to the first insulating member of the invention. Then, the top and bottom ends of the internal negative electrode terminal 17 are crimped, thereby firmly integrating the negative electrode collector 16, the insulating member 19b, the gasket 19a, and the plate-like conductive member 47a, and this ensures the electrical connection between the negative electrode collector 16 and the external terminal 47. In order to reduce the contact resistances between the internal negative electrode terminal 17 and the plate-like conductive member 47a and between the internal negative electrode terminal 17 and the negative electrode collector 16, the boundaries between the crimping part of the internal negative electrode terminal 17 and the plate-like conductive member 47a and between the crimping part of the internal negative electrode terminal 17 and the negative electrode collector 16 may be laser-welded.

On the front face of the sealing plate 20, the protrusion 40 and the auxiliary protrusion 41 are formed on both sides of the mouth 35. The annular concave portion 40b is formed around the protrusion 40, and the annular concave portion 41a is formed around the auxiliary protrusion 41. The concave portion 40a is formed on the top of the protrusion 40, and the concave portion 40c is formed on the back face of the sealing plate 20 at a position corresponding to the protrusion 40. On a face of the insulating plate 49 facing to the sealing plate 20, a concave portion 49a is formed at a position corresponding to the protrusion 40 of the sealing plate 20, and an annular convex part 49b is formed at a position corresponding to the annular concave portion 40b of the sealing plate 20. Similarly, a concave portion 49c is formed at a position corresponding to the auxiliary protrusion 41 of the sealing plate 20, and an annular convex part 49d is formed at a position corresponding to the annular concave portion 41a of the sealing plate 20.

When the insulating plate 49 having such a structure is disposed on the sealing plate 20 having such a structure, the protrusion 40 and the annular concave portion 40b of the sealing plate 20 are fitted to the concave portion 49a and the annular convex part 49b of the insulating plate 49, respectively. The auxiliary protrusion 41 and the annular concave portion 41a of the sealing plate 20 are fitted to the concave portion 49c and the annular convex part 49d of the insulating plate 49, respectively. At the time, the protrusion 40 of the sealing plate 20 has the R shape having a small radius and this increases the fitting strength between the protrusion 40 of the sealing plate 20 and the concave portion 49a of the insulating plate 49. In addition, the sealing plate 20 and the insulator 49 are fitted to each other at two sites of the protrusion 40 site and the auxiliary protrusion 41 site. Therefore, even when a rotary torque is applied to the bolt 47b of the external negative electrode terminal 47 as shown by the arrow, for example, the insulating member 49 is unlikely to cause rotary displacement and to be deformed.

In addition, in the insulating plate 49 used in the prismatic nonaqueous electrolyte secondary battery 10 of the embodiment, a cave 49e is formed on the opposite face to the sealing plate 20, and the plate-like conductive member 47a of the external negative electrode terminal 47 is fitted into the cave 49e. With such a structure, the fitting portion to the insulating plate 49 can absorb a part of the rotary torque from the bolt 47b of the external negative electrode terminal 47 through the plate-like conductive member 47a. As a result, the rotary displacement between the sealing plate 20 and the insulating plate 49 is further unlikely to be caused.

In the embodiment, the insulating member disposed on the sealing plate 20 is exemplified by two members of the gasket 19a and the insulator 49, but even an integrated insulating member can provide the same effect.

The embodiment describes the prismatic nonaqueous electrolyte secondary battery as an example of the prismatic secondary battery. However, the invention is also applicable to a prismatic secondary battery using an aqueous electrolyte, such as a nickel-hydrogen secondary battery.

What is claimed is:

1. A prismatic secondary battery comprising:
   a prismatic hollow outer body having a mouth portion and a bottom;
   a sealing plate sealing up the mouth portion;
   an electrode assembly being stored in the prismatic hollow outer body; and
   an internal terminal being electrically connected to the electrode assembly,
   a first insulating member being disposed on a first face of the sealing plate,
   a second insulating member being disposed on a second face of the sealing plate,
   the first insulating member including a conductive member having a bolt standing on an opposite face to the sealing plate,
   each of the sealing plate, the first insulating member, and the second insulating member having a through-hole,
   the internal terminal being electrically connected to the conductive member through the through-holes formed in the sealing plate, the first insulating member, and the second insulating member in a manner electrically insulated from the sealing plate,
   a protrusion being formed on the first face of the sealing plate,
   a first concave portion being formed on a face of the first insulating member closer to the sealing plate and being fitted to the protrusion; and
   a concave portion being formed on a top face of the protrusion, wherein an annular concave portion is formed around at the protrusion;
   wherein
   in a direction perpendicular to the sealing plate, an undersurface of the concave portion formed on the top face of the protrusion exists at a position higher than an undersurface of the annular concave portion formed around at the protrusion.

2. The prismatic secondary battery of claim 1, wherein an outer diameter of an end of the protrusion is less than an outer diameter of a root of the protrusion.

3. The prismatic secondary battery of claim 2, wherein the protrusion has a rounded rectangle shape in a planar view.

4. The prismatic secondary battery of claim 3, wherein
   an auxiliary protrusion is formed on the first face of the sealing plate;
   the through-hole exists between the protrusion and the auxiliary protrusion;
   a second concave portion is formed on the face of the first insulating member closer to the sealing plate; and
   the second concave portion is fitted to the auxiliary protrusion.

5. The prismatic secondary battery of claim 4, wherein the shape of the protrusion in a planar view is different from the shape of the auxiliary protrusion in a planar view.

6. The prismatic secondary battery of claim 5, wherein the auxiliary protrusion has a circle shape in a planar view.

7. The prismatic secondary battery of claim 6, wherein
   the first insulating member includes a gasket for electrically insulating the internal terminal from the sealing plate and an insulating plate disposed between the conductive member and the sealing plate;
   the first concave portion and the second concave portion are formed on the insulating plate;
   the gasket is a discrete body separate from the insulating plate;
   the insulating plate has a through-hole;
   the internal terminal has a flange;
   the flange is arranged in the inside of the through-hole of the insulating plate; and
   at least a part of the gasket is arranged in the inside of the through-hole of the insulating plate.

8. The prismatic secondary battery of claim 7, wherein
   the conductive member is disposed on the top face of the flange of the internal terminal;
   the conductive member has a through-hole;
   the internal terminal has an upper part which is a part of the internal terminal above the flange;
   the upper part of the internal terminal is arranged to pass through the through-hole of the conductive member;
   the internal terminal has a lower part which is a part of the internal terminal below the flange; and
   the lower part of the internal terminal is arranged to pass through the through-hole of the sealing plate.

9. The prismatic secondary battery of claim 4, wherein an annular protrusion is formed around the second concave portion of the first insulating member and is fitted to the annular concave portion.

10. The prismatic secondary battery of claim 4, wherein
    a concave portion (38c shown in FIG. 4A) is formed on the second face corresponding to the formed position of the protrusion;
    the sealing plate has a concave portion formed on the back face corresponding to the formed positions of the protrusions; and
    the sealing plate has a concave portion formed on the second face corresponding to the formed position of the protrusion.

11. The prismatic secondary battery of claim 1, wherein
    an auxiliary protrusion is formed on the first face of the sealing plate;
    the through-hole exists between the protrusion and the auxiliary protrusion;
    a second concave portion is formed on the face of the first insulating member closer to the sealing plate; and
    the second concave portion is fitted to the auxiliary protrusion.

12. The prismatic secondary battery of claim 11, wherein the protrusion has a rounded rectangle shape in a planar view.

13. The prismatic secondary battery of claim 12, wherein the shape of the protrusion in a planar view is different from the shape of the auxiliary protrusion in a planar view.

14. The prismatic secondary battery of claim 13, wherein an outer diameter of an end of the protrusion is less than an outer diameter of a root of the protrusion.

15. The prismatic secondary battery of claim 14, wherein the first insulating member includes a gasket for electrically insulating the internal terminal from the sealing plate and an insulating plate disposed between the conductive member and the sealing plate;

the first concave portion and the second concave portion are formed on the insulating plate;

the gasket is a discrete body separate from the insulating plate;

the insulating plate has a through-hole;

the internal terminal has a flange;

the flange is arranged in the inside of the through-hole of the insulating plate;

at least a part of the gasket is arranged in the inside of the through-hole of the insulating plate;

the conductive member is disposed on the top face of the flange of the internal terminal;

the conductive member has a through-hole;

the internal terminal has an upper part which is a part of the internal terminal above the flange; the upper part of the internal terminal is arranged to pass through the through-hole of the conductive member;

the internal terminal has a lower part which is a part of the internal terminal below the flange; and the lower part of the internal terminal is arranged to pass through the through-hole of the sealing plate.

16. The prismatic secondary battery of claim 15, wherein an annular protrusion is formed around the second concave portion of the first insulating member and is fitted to the annular concave portion.

17. The prismatic secondary battery of claim 1, wherein the protrusion has a rounded rectangle shape in a planar view.

18. The prismatic secondary battery of claim 1, wherein
an auxiliary protrusion is formed on the first face of the sealing plate;

the through-hole exists between the protrusion and the auxiliary protrusion;

a second concave portion is formed on the face of the first insulating member closer to the sealing plate;

the second concave portion is fitted to the auxiliary protrusion; and the shape of the protrusion in a planar view is different from the shape of the auxiliary protrusion in a planar view.

19. The prismatic secondary battery of claim 1, wherein there is no contact between the bottom of the concave portion and the first insulating member.

20. The prismatic secondary battery of claim 1, wherein the protrusion has an R-shaped end such that an outer diameter of an end of the protrusion is slightly less than an outer diameter of a root of the protrusion; the protrusion has a rounded rectangle shape in a planar view; an auxiliary protrusion is formed on the first face of the sealing plate; the through-hole exists between the protrusion and the auxiliary protrusion; and a second concave portion is formed on the face of the first insulating member closer to the sealing plate.

* * * * *